United States Patent [19]

Sattler et al.

[11] 4,154,896

[45] May 15, 1979

[54] PHOTOSENSITIVE SOLVENTLESS OIL FREE LOW VISCOSITY COATING COMPOSITION

[75] Inventors: Frank A. Sattler; George D. Dixon, both of Monroeville, Pa.

[73] Assignee: Westinghouse Electric Corp., Pittsburgh, Pa.

[21] Appl. No.: 878,858

[22] Filed: Feb. 17, 1978

[51] Int. Cl.$^2$ .............................................. B32B 15/08
[52] U.S. Cl. ............................... 428/458; 204/159.15; 204/159.18; 204/159.19; 252/62; 260/861; 427/54; 427/104
[58] Field of Search ...................... 204/159.15, 159.18, 204/159.19; 260/861; 427/54, 104; 428/458; 252/62, 63, 63.2

[56] References Cited

U.S. PATENT DOCUMENTS

| | | | |
|---|---|---|---|
| 3,567,494 | 3/1971 | Fitko | 204/159.19 X |
| 3,620,989 | 11/1971 | Cummings | 260/22 CB |
| 3,669,825 | 6/1972 | Hall | 204/159.19 X |
| 3,743,615 | 7/1973 | Yethon | 260/22 CB |
| 3,760,033 | 9/1973 | Arbuckle et al. | 204/159.15 X |
| 3,812,063 | 5/1974 | Kimura et al. | 204/159.15 X |
| 3,839,171 | 10/1974 | Akamatsu et al. | 204/159.15 |
| 3,919,063 | 11/1975 | Maruyama et al. | 204/159.15 |
| 4,001,097 | 1/1977 | Ogasawara et al. | 204/159.16 |
| 4,028,204 | 6/1977 | Rosen et al. | 204/159.15 X |
| 4,077,925 | 3/1978 | Sattler | 204/159.19 X |

Primary Examiner—Michael R. Lusignan
Assistant Examiner—Thurman K. Page
Attorney, Agent, or Firm—D. P. Cillo

[57] ABSTRACT

A photosensitive, solventless, low viscosity, oil free coating composition is made by admixing: (A) about 40 wt.% to about 90 wt.% of an alkyd component, consisting essentially of a polyhydric alcohol and a dibasic aromatic and aliphatic acid mixture with (B) about 10 wt.% to about 60 wt.% of an acrylate monomer and (C) an effective amount of a photoinitiator; the composition characterized by having a viscosity of up to about 2,000 cps. at 25° C., and being capable of forming an ultraviolet radiation cured, hard, pin hole free film, having a thickness of under about 5 mils.

17 Claims, No Drawings

PHOTOSENSITIVE SOLVENTLESS OIL FREE LOW VISCOSITY COATING COMPOSITION

BACKGROUND OF THE INVENTION

Polyester resins are well known in the art, where an alkyd ingredient is reacted with about 50 wt.% of a vinyl monomer such as styrene, to provide a fast drying resin which may be diluted by addition of aromatic naptha or other solvent, as taught by Yetkon, in U.S. Pat. No. 3,743,615. The use of low molecular weight materials and large amounts of solvents however provided films which tend to be soft, and posed fire and ecology problems. Cummings, in U.S. Pat. No. 3,620,989, attempted to solve these problems by using a water emulsion, oil based copolymer of glycerol, soya oil, maleic anhydride, phthalic acid and ethylhexyl acrylate or vinyl acetate, with a large excess of maleic anhydride over phthalic acid. Sattler, in U.S. Pat. No. 4,077,925, U.S. Ser. No. 745,727, filed Nov. 26, 1976 provided a nonaqueous polyester resin, having a high temperature capability, for use in impregnating thick mica insulation. This resin comprised a fatty acid oil based alkyd component, reacted with an alkyl acrylate monomer. Such fatty acid oil based compositions, however, while having outstanding thermal properties, could not easily be coated onto metal substrates at thicknesses of under about 0.5 mils (0.0005 inches). While photoinitiators could be present to initiate gelation, U.V. curing provided soft films, and a complete cure required the application of heat.

The cores of transformers and generators consist of laminations stamped from a continuous roll of steel. It is preferred to have an ultra thin, very tough insulating layer between each lamination. The thinner the insulation coating, the less bulky the core. A great deal of time and labor would be saved if the steel roll could be continuously coated with a very thin layer of insulating material before the stamping operation. This would require a very low viscosity coating resin, capable of fast application and pinhole free cure, to form a tough film. Coating metals also presents special problems of metal wetting and film adhesion.

With regard to metal coating compositions, Hall, in U.S. Pat. No. 3,669,825, taught 10 mil thick, photosensitive, metal coating compositions. The compositions comprised a catalyst-free polyester mixed with a styrene vinyl monomer, in association with an organic substituted ester of a metal acid, like titanic or zirconic acid, as an adhesion-promoting agent. The coating composition was applied continuously, to a substrate on a conveyor moving at about 20 ft./min. The coating was curable in such thick layers, without catalysts, by initial radiation treatment, followed by a complete heat cure, or by use of high energy radiation, such as electron bombardment by radium or strontium 90.

Fitko, in U.S. Pat. No. 3,567,494, did not require oven baking cycles or use of dangerous radiation sources, providing thin, ultraviolet radiation curable, metal coating compositions that did not require adhesion-promoting agents to wet the metal. The coating compositions comprised acrylic esters, prepared by coesterification, under a nitrogen atmosphere, and with a condensation catalyst, of a polyhydric alcohol, with acrylic acid, a monofunctional aliphatic acid, and a saturated aliphatic or unsaturated dicarboxylic acid, in a toluene medium. After solvent removal, a viscous, acrylic ester reaction product was provided, which could be ultra-violet radiation cured, to form 0.1 to 2 mil thick films. Such films however would have poor thermal properties.

What is needed is a 100% solids, oil free polyester resin composition, having good pot life, low volatility, good thermal properties, a low viscosity without addition of non-reactive diluents or solvents, and which can be quickly coated on metallic foil or strips at thicknesses below about 5 mils, and preferably below about 0.5 mil. It should quickly cure, solely under ultraviolet radiation without heating, without surface inhibition, to a hard, scratch resistant, tough insulation, with no solvent removal, or fire hazard problems.

SUMMARY OF THE INVENTION

These problems are solved by providing an oil free, photosensitive, solventlesss, coating composition, having an initial viscosity of up to about 2,000 cps. at 25° C.; comprising an alkyd component blended and copolymerized with a reactive acrylic monomer, preferably containing at least two acrylic acid moieties, which can provide a pin hole free, ultraviolet light cured film, having a thickness of under 5 mils on a metal substrate.

The alkyd component contains a polyhydric alcohol, such as glycerol, organic aromatic dibasic acids and organic aliphatic dibasic acids. The reactive acrylic monomer comprises a high boiling acrylate monomer, preferably containing at least two acrylic acid moieties, such as tetraethylene glycol diacrylate, and hexanediol diacrylate.

The insulating varnish will contain about 40 wt.% to about 90 wt.% alkyd component and about 10 wt.% to about 60 wt.% acrylate monomer. With the proper condensation promoters, inhibitors, and photoinitiators, a 100% solids resinous composition can be formulated to give low volatility, good pot life, a viscosity of below about 2,000 cps., preferably below about 900 cps. at 25° C., without addition of non-reactive diluents or solvents, a flash point of over 45° C., fast cure to a tough film, and between a 135° C. to 180° C. (class H) temperature capability.

These compositions can be ultrathin film coated on any suitable substrate and pose no pollution problems since they contain no solvent. These resinous compositions can cure quickly under ultraviolet radiation to form a hard, tough, abrasion resistant, pin hole free film, having a thickness below about 5 mils, preferably below about 0.5 mil, and are particularly useful as insulating coating compositions for the lamination of transformer and generator cores. The coated article can be continuously passed by an U.V. light source at a rate of speed effective to cure the film without the application of heat.

DESCRIPTION OF THE PREFERRED EMBODIMENTS

Polyester resins useful in this invention can be produced by a variety of techniques, including condensation of polyhydric alcohols, such as glycerol: 1,2-propylene glycol; diethylene glycol or tris (2-hydroxyethyl) isocyanurate, with a dicarboxylic acid such as terephthalic acid and maleic anhydride. Other ingredients include condensation reaction catalysts. Inhibitors can be added to prevent room temperature gelation and improve pot life. Ultraviolet radiation photoinitiators are added in an amount effective to cure the system using U.V. light. This alkyd component is then copolymerized with a reactive acrylic monomer.

The polyester resins are produced by heating the component polyhydric alcohols, acids and condensation reaction catalysts, at between about 150° C. to about 240° C., for about 5 hours to about 10 hours. The reaction is followed by measuring the acid number, i.e., the number of milligrams of KOH equivalent to the acidity present in one gram of resin. The reaction is continued until the acid number goes down to between about 5 to 25. The alkyd component is then cooled below about 120° C., and an inhibitor is added. The alkyd component is then dissolved in the reactive acrylic monomer. The preparation and materials generally used are well known and reference may be made to *Plastic Materials by J. A. Brydson*, pages 431–450 (1966) herein incorporated by reference, for a complete description of their synthesis and properties.

In this invention, the oil free insulating varnish will contain about 40 wt.% to about 90 wt.% of alkyd component and about 10 wt.% to about 60 wt.% of an acrylate monomer. The alkyd component will comprise about 55 equivalent % to about 70 equivalent % of polyhydric alcohol; and about 30 equivalent % to about 45 equivalent % of organic bifunctional acid mixture, of which about 40 equivalent % to about 90 equivalent % of the organic dibasic acid will be an aromatic (aryl) acid and about 10 equivalent % to about 60 equivalent % will be an unsaturated aliphatic acid. No vinyl monomers such as styrene are used, and no fatty acids or fatty acid oils are used in this invention since they contribute significantly to cured film softness and reduce the speed of cure.

No non-reactive solvents or diluents, such as methyl cellosolve or xylene are used, the composition of this invention being considered solventless. Water may be used to initiate the condensation reaction. No air pollution solvent removal problems are encountered, the composition being fomulated to have a low viscosity without solvents.

The term equivalent %, as employed herein, is calculated as follows:

Equivalent % equals
100 (Number of Moles of Total Ingredient x Functionality of Ingredient) Sum (Number of Moles of Total Ingredient x Functionality of Ingredient)

All ingredients which have reactive groups are considered in the Sum, which serves as the divisor in the formula, whether already reacted or available for reaction when cured. The functional groups are anhydride, carboxyl, and hydroxyl. The polyhydric alcohols may be bifunctional or trifunctional, the dibasic acids will be bifunctional, although trimellitic anhydride should be considered trifunctional.

Useful polyhydric alcohols include, for example, ethylene glycol; glycerol; 1,2-propane diol (propylene glycol); diethyleneglycol; triethylene-glycol; neopentyl glycol; hexamethyleneglycol; 1,4-cyclohexanedimethanol; trimethylol ethane; trimethylol propane; 1,4-butane diol; 1,5-pentane diol; pentaerythritol; and tris (hydroxyalkyl) isocyanurate, such as tris (2-hydroxyethyl) isocyanurate and the like. It should also be understood that the tautomeric analogs of the isocyanurate compounds such as tris (2-hydroxyethyl) cyanurate may be employed. These polyhydric alcohols can be used alone or in mixtures.

Useful organic aromatic dibasic (bifunctional) acids include, for example, isophthalic acid; phthalic acid; phthalic anhydride; terephthalic acid; dimethyl terephthalate acid ester; dimethyl isophthalate acid ester; trimellitic anhydride and their mixtures. Of these, terephthalic acid and dimethyl terephthalate are preferred, since they provide harder, more abrasion resistant films and better thermal properties.

Useful organic, unsaturated aliphatic dibasic (bifunctional) acids include maleic acid; maleic anhydride; fumaric acid and their mixtures. Both types of dicarboxylic acid must be present. The aromatic acid is a critical component and a prime contributor to good high temperature thermal stability of the alkyd component, and should generally be present in the greater amount on a molar basis. The unsaturated aliphatic acid must be present to copolymerize the alkyd component with the alkyl acrylate monomers. No saturated aliphatic acids, such as malonic or succinic acids, or vinyl acids, such as acrylic acid are used in the formulation, since they will generally reduce the temperature capability of the coating.

Useful acrylate monomers are those having preferably at least two acrylic acid moieties or groups, boiling points over about 200° C., and molecular weights over about 110. These type monomers are less volatile, and cure faster to tougher, harder, more thermally stable films than simple acrylates such as methyl or ethyl acrylate monomers which were not found to be useful. In the preferred acrylic monomers, having at least two acrylic acid groups, oxygen retardation effects are minimized during ultraviolet radiation curing in this particular composition which excludes fatty acid oils.

Useful polyacrylate monomers include, for example, hexanediol diacrylate (HDDA); neopentyl glycol diacrylate (NPGDA); trimethylol propane triacrylate (TMPTA); tetraethylene glycol diacrylate (TEGDA); and pentaerythritol triacrylate with the first four acrylic monomers being preferred. These polyacrylate monomers can be used alone or in mixtures, or in mixtures with monoacrylate monomers, such as, for example, 2-ethyl hexyl acrylate or 2-hydroxy ethyl acrylate and the like; alkoxy ethyl acrylate monomers, such as, for example, 2-methoxy ethyl acrylate or 2-ethoxy ethyl acrylate and the like; or aryloxy ethyl acrylate monomers, such as, for example, 2-phenoxy ethyl acrylate. These monoacrylate monomers should constitute no more than 10 weight % of the acrylate component i.e., the weight ratio polyacrylate monomer:monoacrylate monomer can range from 10:0 to 9:1. Over 10 weight % monoacrylate will reduce cured film hardness.

These acrylate monomers provide a flash point for the composition of over 45° C. By flash point is meant: the lowest temperature at which the composition in an open vessel gives off enough combustible vapors to produce a momentary flash of fire when a small flame is passed near its surface.

In addition, catalysts, effective to act as a condensation reaction promoter, such as, for example, dibutyl tin oxide, stannous oxalate, butyl stannoic acid, tetraisopropyl titanate, tetra butyl titanate, their mixtures and the like. These may be used in amounts effective to promote the condensation reaction, generally about 0.05 part to about 1.0 part per 100 parts of composition, including the alkyd and acrylic monomer components. Dibutyl tin oxide is the preferred promoter when terephthalic acid is used as the organic aromatic dibasic acid.

Inhibitors such as, for example, picric acid, benzoquinone, hydroquinone, methyl hydroquinone, p-tertiary catechol, pyrogallol, phenol, cresols and the like, may be added in amounts effective to prevent gelation at 26° C., generally about 0.005 part to about 0.5 part per 100 parts of composition. Both the reaction promotion catalysts and inhibitors are well known in the art, and may be used alone or in mixtures.

Photoinitiators must be added in amounts effective to initiate and complete polymerization, with ultraviolet light exposure, to complete cure without heat. It is essential that a complete cure without heat be obtained when thin coatings are used. This would save a great deal of energy, especially in a continuous operation at high coating speeds, and eliminate a time consuming step involving a number of heating banks. Typical photoinitiators well known in the art would include, for example, benzophenone, diethoxyacetophenone, benzoin methyl ether, benzoin ethyl ether, benzoin isopropyl ether, benzoin isobutyl ether, diethoxyxanthanone, chlorothio-xanthanone, azo-bis-isobutyronitrile, their mixtures, mixtures of N-methyl diethanolamine-benzophenone and the like. They may be used at about 1.0 part to about 10 parts preferably about 2.0 parts to 4.0 parts per 100 parts of the coating composition, including the alkyd and acrylic monomer components. No surface inhibition due to oxygen presence in the composition is evident, allowing ease of ultraviolet cure. The resulting coating composition has a viscosity of between about 100 cps. to 2,000 cps. and preferably 200 cps. to 900 cps. at 25° C.

The preparation of the photosensitive coating composition generally comprises addition of the primary ingredients, except the monomer and photosensitizer, which are generally added last, in the critical ranges described, by blending at a temperature of between about 150° C. to about 240° C., until the reaction proceeds to an acid number of between about 5 to 25. The reaction product comprising the alkyd component is then cooled below about 120° C. The alkyd component is then dissolved in the reactive monomer. This provides a metal coating composition having a pot life in dark storage or in a closed container of from about 4 weeks to eighteen months at 25° C. By pot life is meant the number of weeks required for a sample of this varnish to increase in viscosity by a factor of 10, and proceed to form a semi-solid gel having a viscosity of over about 1,000,000 cps. at 25° C. This composition wets metal very well and will coat easily onto metal substrates.

Upon ultraviolet radiation curing, by, for example using a bank of light sources, the composition will completely cure even in a continuous operation at 25° C. No further heating is required or desired. When cured it will have a temperature capability of between 135° C. and 180° C., i.e., it will not melt or degrade at these temperatures after about 40,000 hours of exposure.

Generally, this composition is used as a thin coating insulation. In this application, a continuous roll of steel or other metal foil, for use as a transformer or generator core, is continuously coated by a roller coater, gravure coater or other similar type coating, dipping or spraying means, generally on a conveyor belt, at speeds of from about 20 ft./min. to about 400 ft./min., depending on the number of U.V. light sources. The film is then completely cured using ultraviolet radiation curing means, by continuously passing the coated article by the U.V. source at a rate of speed effective to completely cure the film without the application of heat. This process provides an inexpensive, fast and extremely simple method of insulating metal or other type substrates and forming extremely thin, tough, pin hole free films thereon.

EXAMPLE

High temperature, solventless, insulating, photosensitive coating composition was prepared. A reaction flask equipped with stirrer and thermometer was filled with: 326.8 grams of ethylene glycol, 161.2 grams of glycerol, 90.9 grams of triethylene glycol, 352.0 grams of 1,2-propane diol (propylene glycol), 592.0 grams of tris-(2 hydroxy ethyl)-isocyanurate-all polyhydric alcohols; 897.0 grams of terephthalic acid-organic aromatic dibasic acid; 13.6 grams of dibutyl tin oxide-condensation reaction promoter; and 61.6 grams of distilled water, to initiate the condensation reaction. The ingredients were heated rapidly to 185° C. and then from 185° C. to 215° C. at a rate of 10° C. per hour temperature increase and held at 215° C. for one hour, at which time the mixture was clear. The mixture was then cooled to 190° C. and 383.2 grams of maleic anhydride-organic unsaturated aliphatic dibasic acid was added. The reaction was continued at 200° C. until an acid number of 16 was reached. This alkyd component was then cooled below 90° C. and 4.9 grams of benzoquinone inhibitor was added. This alkyd component was then dissolved in a mixture of alkyl acrylate monomers, consisting of 1,225 grams of hexane diol diacrylate; and 1,225 grams of tetraethylene glycol diacrylate. Finally, 196 grams of benzoin isopropyl ether-photoinitiator was added.

This coating composition contained about 50 wt.% alkyd component and 50 wt.% alkyl acrylate monomer. No unreacted diluents or solvents were added, yet the viscosity of the composition was only 650 cps. at 25° C. as measured in a Gardner viscosity tube. The alkyd component contained:

| grams | ingredient/mol wt | = moles | × funct groups | = equivalents |
|-------|-------------------|---------|----------------|---------------|
| 326.8 | ethylene glycol/62.1 | = 5.27 | × 2(OH) | = 10.54 |
| 161.2 | glycerol/92.11 | = 1.75 | × 3(OH) | = 5.25 |
| 90.0 | triethylene glycol/150.1 | = 0.60 | ×2(OH) | = 1.20 |
| 592.0 | isocyanurate/261.1 | = 2.26 | × 3(OH) | = 6.78 |
| 352.0 | propylene glycol/76.1 | = 4.63 | × 2(OH) | = 9.26 |
| 897.0 | aryl acid/166.1 | = 5.40 | × 2(COOH) | = 10.80 |
| 383.2 | aliphatic acid/98.1 | = 3.9 | × 2(COOH) | = 7.80 |
| | | | | Sum = 51.63 |

Equivalent % polyhydric alcohol = 33.03/51.63 = 64%
Equivalent % aryl + aliphatic acid = 18.6/51.63 = 36%
  Within the organic dibasic acid mixture:
Equivalent % aryl acid          = 10.8/18.6 = 58%
Equivalent % aliphatic acid     = 7.8/18.6 = 42%
HDDA mol. wt. = 226; boiling pt. = 316° C.
TEGDA mol wt. $ 302; boiling pt. $ 320L C./

Condensation Promoter = 0.25 part/100 parts composition
Inhibitor             = 0.09 part/100 parts composition

| | |
|---|---|
| Photoinitiator | = 3.7 parts/100 parts composition. |

The following tests were made to evaluate the above 100% solids low viscosity coating composition. A portion of the varnish was poured into a Gardner viscosity tube and the initial viscosity measured. The viscosity tube was placed in a dark chamber and checked periodically for viscosity increase to determine pot life, as described above in the specification. The pot life was determined to be greater than 16 months at 25° C. This composition was then roller coated onto steel panels at a thickness of about 0.5 mils (0.0005 inch) to about 0.2 mils (0.0002 inch), which were placed on a conveyor belt at 25° C. and passed under two 200 watt/inch medium pressure mercury ultraviolet lamp, at a speed of about 40 ft/min. After passing by the U.V. lamps the ultra thin films were found to be completely cured, hard and tough, flexible and pin hole free. The composition had excellent metal wetting properties and coated smoothly. The finish was hard i.e., could not be scratched with a fingernail. No surface inhibition effect was observed. This composition and method of cure would be very useful for continuous coating of steel, aluminum or copper foils or strips.

This coating composition had 135° C. to 180° C. temperature capability and good flash points of about 80° C. to 100° C. Thermal life tests were run using IEEE No. 57 procedure. The life was over about 5,200 hours at 200° C., with an extrapolated temperature capability for 40,000 hours at 180° C. Other polyhydric alcohols, organic aromatic dibasic acids, organic unsaturated aliphatic dibasic acids, condensation promoters, photoinitiators and acrylic monomers or mixtures described hereinabove would provide equally excellent results.

To provide a comparison of the above described compositions with oil based polyester compositions, a varnish was prepared from 279 grams of glycerol; 233 grams of isophthalic acid; 568 grams of soybean oil fatty acid; 58.8 grams of maleic anhydride; and 0.26 gram picric acid, to provide an alkyd component. Then 57 grams of the alkyd component was dissolved in reactive monomer consisting of 5 grams of ethyl hexyl acrylate plus 12.8 grams of tetraethylene glycol diacrylate and 25.2 grams of trimethylol propane triacrylate along with 0.1 gram benzoquinone and 0.25 gram of tertiary butyl perbenzoate accelerator. A commercial benzoin ether photoinitiator was then added in a weight ratio of 4 parts/100 parts composition. Temperature ranges and reaction conditions were essentially the same as described hereinabove. This oil based composition was roller coated onto a steel strip at a thickness of about 3 mils, and exposed to a 1,000 watt mercury lamp for 1 minute. The film gelled but did not form a hard, scratch resistant coating and had to be cured in an oven for 1 hour at 150° C., to provide a hard film in the completely cured state.

This comparative composition contained, in the alkyd component, approximately 60 equivalent % polyhydricalcohol; 26.5 equivalent % organic dibasic acid mixture; and 13.5 equivalent % soybean fatty acid oil. As can be seen, the oil free coating compositions of this invention provide ultra thin hard coatings which are curable solely from U.V. radiation sources, as distinguished from oil based compositions.

I claim:

1. A solventless, low viscosity, photosensitive, oil free insulating composition, consisting essentially of a 100 wt.% solids blend of:
 (1) an oil free copolymer consisting of:
  (A) about 40 wt.% to about 90 wt.% of an alkyd component consisting of:
   (i) about 55 equivalent % to about 70 equivalent % of a polyhydric alcohol, and
   (ii) about 30 equivalent % to about 45 equivalent % of an organic dibasic acid mixture consisting of:
    (a) about 40 equivalent % to about 90 equivalent % of an organic aromatic dibasic acid, and
    (b) about 10 equivalent % to about 60 equivalent % of an organic unsaturated aliphatic dibasic acid, and
  (B) about 10 wt.% to about 60 wt.% of an acrylate monomer selected from the group consisting of polyacrylate monomers and monoacrylate monomers, where the weight ratio of polyacrylate monomer:monoacrylate monomer is from 10:0 to 9:1, and
  (C) an effective amount of a catalyst effective to act as a condensation reaction promoter and
 (2) about 2 parts to about 10 parts for each 100 parts of copolymer of a photoinitiator effective to initiate polymerization of the composition with ultraviolet light exposure, and
 (3) an effective amount of an inhibitor effective to prevent gellation of the insulating composition at 26° C.; said composition characterized by having 100 wt.% solids, a viscosity of up to about 2,000 cps. at 25° C. and the capability of forming an ultraviolet radiation cured, hard, thin insulating film without the application of heat.

2. The composition of claim 1, wherein the acrylate monomer is a polyacrylate having at least two acrylic acid moieties, a molecular weight of over about 110 and a boiling point of over about 200° C., and the composition has a temperature capability of between 135° C. and 180° C. upon cure.

3. The composition of claim 1, wherein the composition has a viscosity of up to about 900 cps. and is capable of forming an ultraviolet radiation cured pin hole free film, having a thickness of under about 0.5 mils.

4. The composition of claim 1, wherein the acrylate monomer is selected from the group consisting of hexanediol diacrylate, neopentyl glycol diacrylate, trimethylol propane triacrylate, tetraethyleneglycol diacrylate, pentaerythritol triacrylate, 2 ethyl hexyl acrylate, 2 hydroxy ethyl acrylate, and mixtures thereof.

5. The composition of claim 1, wherein the polyhydric alcohol is selected from the group consisting of ethylene glycol, glycerol, 1,2-propanediol, diethylene glycol, triethylene glycol, neopentyl glycol, hexamethyleneglycol, 1,4-cyclohexandeimethanol, trimethylol ethane, trimethylolpropane, 1,4-butanediol, 1,5-pentanediol, pentaerythritol, tris (hydroxyalkyl) isocyanurate and mixtures thereof.

6. The composition of claim 1, wherein the organic aromatic dibasic acid is selected from the group consisting of isophthalic acid, phthalic acid, phthalic anhydride, terephthalic acid, dimethyl terephthalate, dimethyl isophthalate, trimellitic anhydride and mixtures thereof; and the organic unsaturated aliphatic dibasic acid is selected from the group consisting of maleic acid, maleic anhydride, fumaric acid and mixtures thereof.

7. The composition of claim 1, wherein the photoinitiator is selected from the group of compounds consisting of benzophenone, diethoxyacetophenone, benzoin methyl ether, benzoin ethyl ether, benzoin isopropyl ether chlorothioxanthanone, azo-bis-isobutyronitrile, N-methyldiethanolaminebenzophenone and mixtures thereof and the condensation catalyst is selected from the group of compounds consisting of dibutyl tin oxide, stannous oxalate, butyl stannoic acid, tetraisopropyl titanate, tetra butyl titanate and mixtures thereof.

8. The composition of claim 1 containing, from about 0.005 part to about 0.5 part per 100 parts coating composition of inhibitor, wherein the aromatic dibasic acid is terephthalic acid and the condensation reaction promoter is dibutyl tin oxide.

9. A metal substrate coated with the cured composition of claim 1.

10. An iron strip coated with the cured composition of claim 1.

11. A method of coating a metal substrate with a thin insulating film, comprising the steps of:
(1) applying a coating having a thickness of under 5.0 mils, consisting essentially of a 100 wt.% solids blend of:
(A) an oil free copolymer consistng of:
(a) about 40 wt.% to about 90 wt.% of an alkyd component consisting of:
(i) about 55 equivalent % to about 70 equivalent % of a polyhydric alcohol, and
(ii) about 30 equivalent % to about 45 equivalent % of an organic dibasic acid mixture consisting of:
(a) about 40 equivalent % to about 90 equivalent % of an organic aromatic dibasic acid, and
(b) about 10 equivalent % to about 60 equivalent % of an organic unsaturated aliphatic dibasic acid, and
(b) about 10 wt.% to about 60 wt.% of an acrylate monomer having at least two acrylic acid moieties and a molecular weight of over about 110, and
(c) an effective amount of a catalyst effective to act as a condensation reaction promoter and
(B) about 2 parts to about 10 parts for each 100 parts of copolymer of a photoinitiator effective to initiate polymerization of the composition with ultraviolet light exposure, and
(C) an effective amount of an inhibitor effective to prevent gellation of the insulating composition at 26° C.; said composition characterized by having 100 wt.% solids, a viscosity of up to about 900 cps. at 25° C. and the capability of forming an ultraviolet radiation cured, hard thin film; and
(2) continuously passing the coated metal substrate by an ultraviolet light source at a rate of speed effective to completely cure the coating composition to a pin hole free, hard, thin insulating film without the application of heat.

12. The method of claim 11, wherein the acrylate monomer is selected from the group consisting of hexanediol diacrylate, neopentylglycol diacrylate, trimethylol propane triacrylate, tetraethyleneglycol diacrylate, pentaerythritol triacrylate, and mixtures thereof; the polyhydric alcohol is selected from the group consisting of ethylene glycol, glycerol, 1,2-propanediol, diethylene glycol, triethylene glycol, neopentyl glycol, hexamethylene-glycol, 1,4-cyclohexanedimethanol, trimethylol ethane, trimethylolpropane, 1,4-butanediol, 1,5-pentanediol, pentaery-thritol, tris (hydroxy alkyl) isocyanurate and mixtures thereof; the organic aromatic dibasic acid is selected from the group consisting of isophthalic acid, phthalic acid, phthalic anhydride, terephthalic acid, dimethyl terephthalate, dimethyl isophthalate, trimellitic anhydride and mixtures thereof; and the organic unsaturated aliphatic dibasic acid is selected from the group consisting of maleic acid, maleic anhydride, fumaric acid and mixtures thereof.

13. The method of claim 11, wherein the photoinitiator is selected from the group of compounds consisting of benzophenone, diethoxyacetophenone, benzoin methyl ether, benzoin ethyl ether, benzoin ispropyl ether chlorothioxanthanone, azo-bis-isobutyronitrile, N-methyldialthonolaminebenzophenone and mixtures thereof; the condensation catalyst is selected from the group of compounds consisting of dibutyl tin oxide, stannous oxalate, butyl stannoic acid, tetraisopropyl titanate, tetra butyl titanate and mixtures thereof; and the inhibitor is selected from the group consisting of picric acid, benzoquinone, hydroquinone, methyl hydroquinone, p-tertbutyl catechol, pyrogallol, phenol, and cresol.

14. The composition of claim 8, wherein the inhibitor is selected from the group consisting of picric acid, benzoquinone, hydroquinone, methyl hydroquinone, p-tertbutyl catechol, pyrogallol, phenol, and cresol.

15. A solventless, low viscosity, photosensitive, oil free insulating composition, consisting of a 100 wt.% solids blend of:
(1) an oil free copolymer consisting of:
(A) about 40 wt.% to about 90 wt.% of an alkyd component consisting of:
(i) about 55 equivalent % to about 70 equivalent % of a polyhydric alcohol, and
(ii) about 30 equivalent % to about 45 equivalent % of an organic dibasic acid mixture consisting of:
(a) about 40 equivalent % to about 90 equivalent % of an organic aromatic dibasic acid, and
(b) about 10 equivalent % to about 60 equivalent % of an organic unsaturated aliphatic dibasic acid, and
(B) about 10 wt.% to about 60 wt.% of an acrylate monomer having at least two acrylate moieties, a molecular weight of over about 110 and a boiling point of over about 200° C., and
(C) an effective amount of a catalyst selected from the group consisting of dibutyl tinoxide, stannous oxalate, butyl stannoic acid, tetraisopropyl titanate, tetra butyl titanate and mixtures thereof, effective to act as a condensation reaction promoter and
(2) about 2 parts to about 10 parts for each 100 parts of copolymer of a photoinitiator effective to initiate polymerization of the composition with ultraviolet light exposure, and
(3) an effective amount of an inhibitor effective to prevent gellation of the insulating composition at 26° C.; said composition characterized by having 100% solids, a viscosity of up to about 2,000 cps. at 25° C. and the capability of forming an ultraviolet radiation cured, hard, thin insulating film without the application of heat.

16. A metal substrate coated with the cured composition of claim 15.

17. An iron strip coated with the cured composition of claim 15.

* * * * *